E. S. DRAKE.
Lamp.

No. 204,305. Patented May 28, 1878.

Witnesses:
P. C. Dietrich
Frank H. Duffy

Inventor:
Edwin S. Drake.
Per C. H. Watson & Co. Attorneys.

N. PETERS, PHOTO-LITHOGRAPHER, WASHINGTON, D. C.

UNITED STATES PATENT OFFICE.

EDWIN S. DRAKE, OF BROOKLYN, NEW YORK.

IMPROVEMENT IN LAMPS.

Specification forming part of Letters Patent No. 204,305, dated May 28, 1878; application filed April 30, 1878.

*To all whom it may concern:*

Be it known that I, EDWIN S. DRAKE, of Brooklyn, in the county of Kings and State of New York, have invented certain new and useful Improvements in Lamps; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to that class of lamps in which the reservoir is located away from the burners; and the nature of my invention consists in the construction of devices for opening and closing the valve in the bottom of the reservoir, and for locking the reservoir in place, as will be hereinafter more fully set forth.

Figure 1:
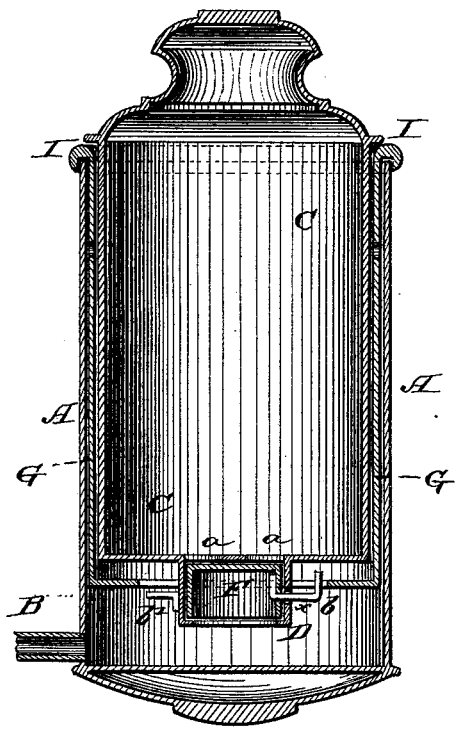
Figure 2:
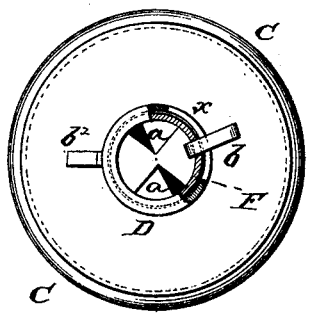
Figure 3:
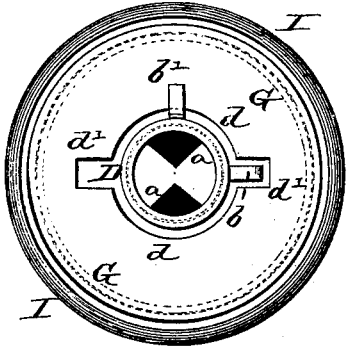
Figure 4:
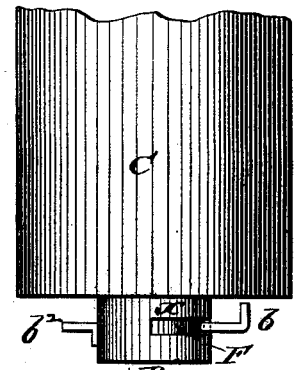

In the annexed drawing, Figure 1 represents a vertical section of the reservoir and outside cup with my invention applied thereto. Fig. 2 is a bottom view of the reservoir. Fig. 3 is a bottom view of the reservoir and movable cylinder. Fig. 4 is a side view of the lower part of the reservoir.

A represents the outer shell or cup, provided at or near the bottom with a pipe, B, for conducting the oil to the burner. C is the reservoir, provided in its bottom with one or more apertures, $a$, surrounded by a downwardly-projecting collar, in which is placed a cylindrical valve, F, for opening and closing the apertures. This valve is held to its seat by means of an arm, $b$, which passes through a slot, $x$, in the collar, and which also allows the valve to be turned as far as required. The end of the arm $b$ is bent upward, as shown.

The collar D is provided with an arm, $b'$, projecting radially outward from the same. The reservoir C is surrounded by a cylinder, G, formed or provided with a milled rim, I, which overhangs the upper edge of the cup A, as shown in Fig. 1.

In the bottom of the cylinder G is a central round opening, $d$, with two radial slots, $d'$ $d'$, projecting from the same.

After the reservoir is filled and the valve F closed, it is inverted and placed in the cylinder G, which is previously placed inside of the reservoir. The arms $b$ $b'$ pass through the slots $d'$ $d'$ in the bottom of the cylinder. By now holding the reservoir steady with one hand and turning the cylinder G with the other, the valve F is opened by the arm $b$ catching in one of the slots $d'$, while at the same time the reservoir is locked to the cylinder by the arm $b'$ passing under the bottom of the cylinder.

The reservoir cannot be removed from the cylinder until the valve has first been closed.

Having thus fully described my invention, what I claim as new, and desire to secure by Letters Patent, is—

1. The shell A and cylinder G, in combination with the reservoir C and a valve, F, at or near the bottom, whereby the valve may be opened and closed by turning the cylinder G without moving the reservoir or shell A, substantially as and for the purpose set forth.

2. The shell A and cylinder G, in combination with the reservoir C and a locking device, whereby the reservoir may be locked and unlocked by turning the cylinder G, and without moving the reservoir or shell A, substantially as and for the purpose set forth.

3. The shell A and cylinder G, in combination with the reservoir C and a locking device and valve, whereby the valve may be opened and closed, the reservoir locked and unlocked by turning the cylinder G, and without moving the reservoir or shell A, substantially as and for the purpose set forth.

In testimony that I claim the foregoing as my own I have hereto affixed my signature in presence of two witnesses.

EDWIN S. DRAKE.

Witnesses:
C. H. WATSON,
WM. B. UPPERMAN.